Nov. 14, 1961    B. BARÉNYI    3,008,760
ROOF CONSTRUCTION FOR MOTOR VEHICLES
Filed Oct. 1, 1957    2 Sheets-Sheet 1

INVENTOR
BELA BARÉNYI

BY *Deicke and Craig.*

ATTORNEYS

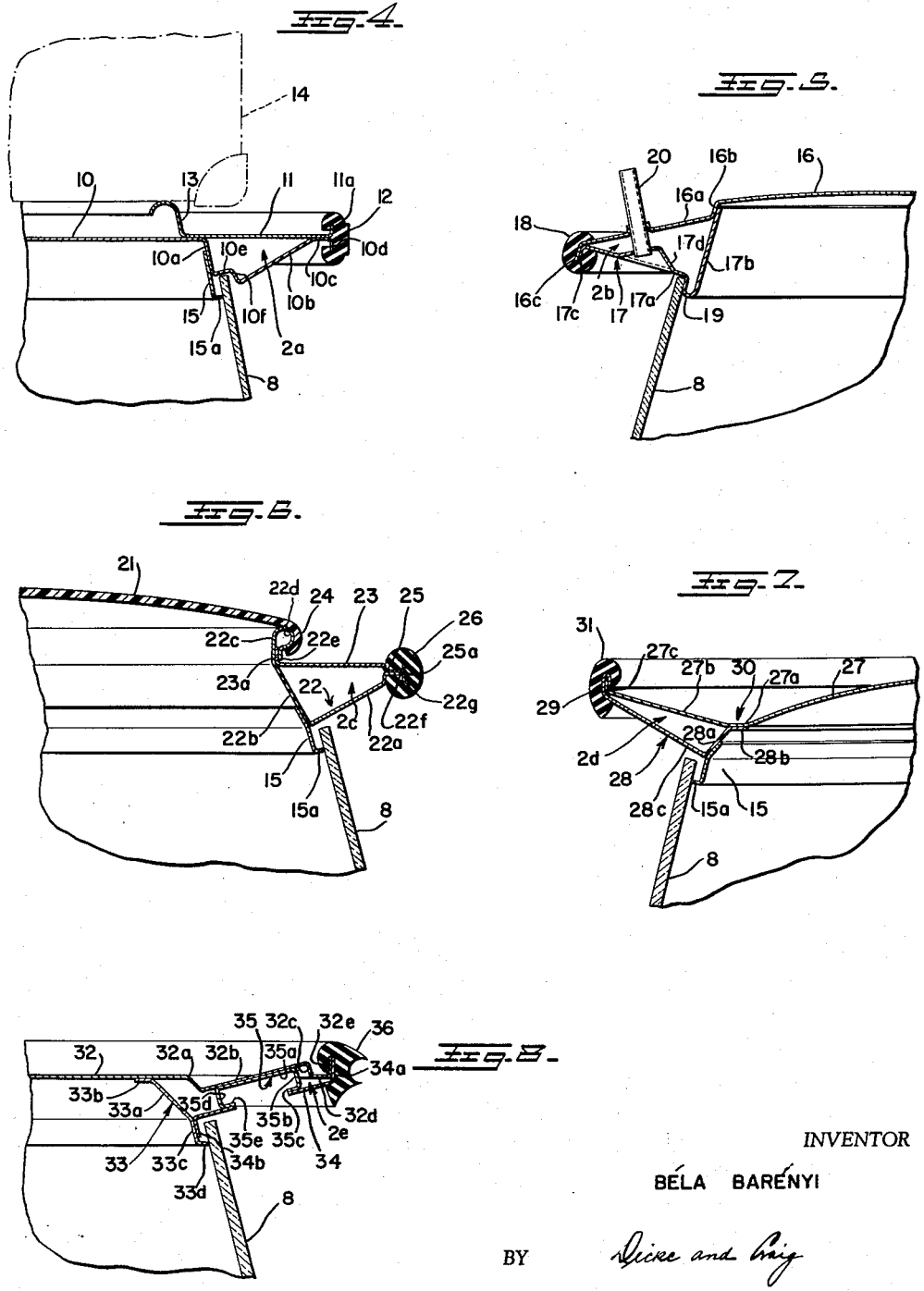

United States Patent Office 3,008,760
Patented Nov. 14, 1961

3,008,760
ROOF CONSTRUCTION FOR MOTOR VEHICLES
Béla Barényi, Stuttgart-Vaihingen, Germany, assignor to Daimler-Benz Aktiengesellschaft, Stuttgart-Unterturkheim, Germany
Filed Oct. 1, 1957, Ser. No. 687,520
Claims priority, application Germany Oct. 6, 1956
9 Claims. (Cl. 296—137)

The present invention relates to a motor vehicle, especially a passenger motor vehicle of the sedan type with a closed top and provided with a flat or slightly arched roof, and more particularly relates to the construction of the rim portion of the roof which is formed by a hollow body or frame member made of a plurality of individual parts suitably secured together.

The present invention essentially consists therein that the roof rim portion which projects at least on three sides thereof beyond the lateral walls of the top primarily constituted by the window surfaces of the windshield, of the rear window, and of the side or door windows, as well as by the body wall parts of the top, is formed by a hollow body, the cross section of which corresponds at least approximately to the form of a triangle standing on one of its points as seen in cross section. The hollow body may thereby be constructed appropriately annularly shaped or horse-shoe shaped as seen in plan view.

By the use of a construction in accordance with the present invention, the roof rim portion which projects beyond the lateral walls of the vehicle top is advantageously reinforced in a bearer-like manner without impeding in any way the vision through the windows of the top.

According to another feature of the present invention, the vehicle may be advantageously so constructed that at least one wall of the hollow body forming the roof rim portion which is preferably made of sheet metal is integrally connected or formed with the member constituting the roof surface itself. Possibly the roof surface properly speaking which is surrounded by the hollow roof body may be made of a material different from that of the hollow body, for example, made of transparent synthetic material, such as plastic, which may be inserted into the roof frame formed by the hollow body and suitably secured thereo.

The hollow body itself may be constructed in different ways, for example, at least two walls of the hollow body may be constructed in a strip-like manner, for example, of sheet-metal strips, and may be connected with each other along the edges thereof. In other embodiments in accordance with the present invention, two adjacent walls forming two sides of the triangle of the hollow body may be integrally connected with each other and possibly may also be integrally formed with the roof surface and may be completed into the hollow triangularly-shaped rim portion by a third wall forming the third side of the triangle which is inserted therein and suitably secured thereto.

For purposes of accommodating the window panes of the vehicle top, the hollow body forming the roof rim portion may be appropriately so constructed that at the lower edge thereof, an abutment surface, for example, a ledge member is provided thereat against which the edge of the window may abut or that a groove or channel is formed thereby into which the upper edge of the window pane may be embedded. In a motor vehicle with a sliding door, a guide rail for the sliding door may be arranged in the outwardly projecting lower wall of the hollow body.

A channel-like recess in the course of the roof rim portion may be constructed in accordance with the present invention by off-setting the hollow body with respect to the main roof surface. Possibly, however, the outwardly extending upper wall of the hollow body may also be inclined upwardly with respect to the main roof surface. A support for luggage pieces, etc. which projects beyond the roof surface and which may be formed in a simple manner by providing a flanged edge portion along the inner upper point of the triangularly-shaped hollow body which flanged edge portion projects beyond the roof surface.

The outer enclosure of the roof rim portion may appropriately be formed by a flanged rim arranged along the outer edge of the hollow body which projects upwardly beyond the upper wall of the hollow body. A guard rail, especially made of elastic material, may also be arranged at this outer flanged rim over which the guard rail is suitably secured. For purposes of providing support or securing means for the luggage pieces, etc., accommodated on the roof, sleeve-shaped support members may be appropriately arranged in the outwardly projecting part of the hollow body which extend through two walls of the hollow body.

Accordingly, it is an object of the present invention to provide a construction for the rim portion of a roof supported by the top of a vehicle which is both simple and sturdy.

Still another object of the present invention is to provide a rim portion for the roof which projects on at least three sides thereof beyond the lateral walls of the top supporting the roof and which is constituted by a hollow bearer member or body formed of a plurality of sections which are so combined and connected as to reinforce each other.

Still another object of the present invention resides in the provision of a roof frame of annular or U-shape constituting the rim portion of the roof and formed as hollow body or bearer member which may be made, for example, of metal, and into which may be emplaced a roof made of transparent plastic material and appropriately secured thereto.

A still further object of the present invention resides in the provision of a rim construction for a roof in the form of a hollow body which at the same time provides abutment ledges and guide rails for the windows and slidable doors of a motor vehicle.

Still another object of the present invention is the provision of a roof construction in which the rim portion is formed as a hollow body or bearer member projecting beyond the lateral walls of the top and which simultaneously forms support and/or securing means for luggage pieces, etc. which are carried on top of the roof.

These and other objects, features and advantages of the present invention will become more obvious from the following description when taken in connection with the accompanying drawing, which shows, for purposes of illustration only, several embodiments in accordance with the present invention, and wherein:

FIGURES 3 to 8 show cross-sectional views of different embodiments of a roof construction provided with a rim formed by a hollow body or bearer member in accordance with the present invention.

Figure 1:
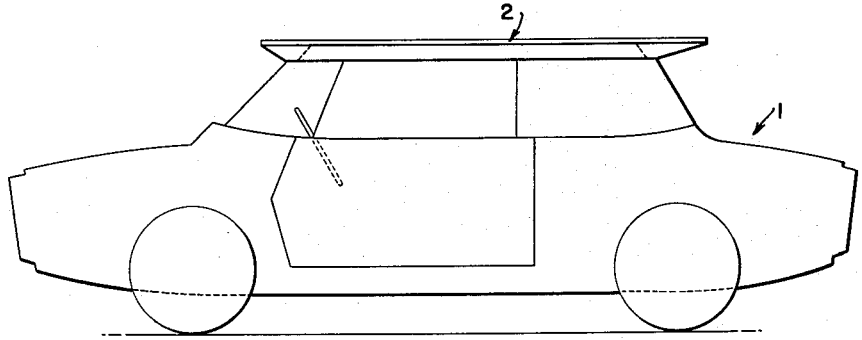
FIGURE 1 is a side view of a passenger motor vehicle provided with a roof having an upwardly outwardly projecting rim portion in accordance with the present invention.
Figure 2:
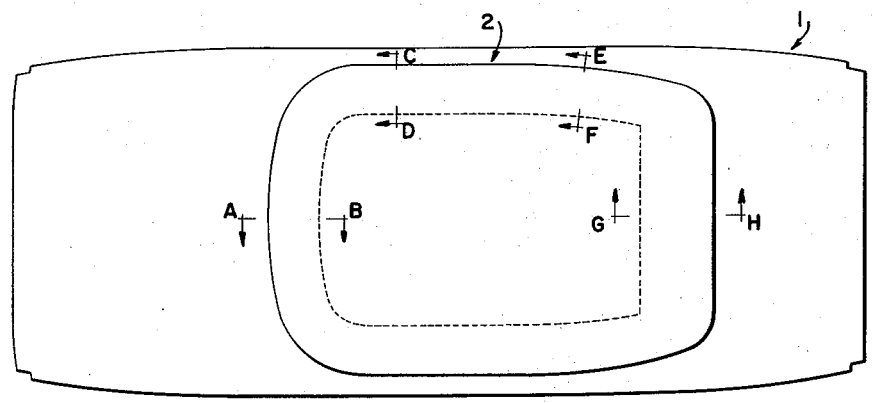
FIGURE 2 is a plan view of the motor vehicle illustrated in FIGURE 1.

Referring now to the drawing, and more particularly to FIGURES 1 and 2, reference numeral 1 designates therein the vehicle body of, for example, a pontoon-shaped passenger motor vehicle of the sedan type with a closed top, the roof of which is approximately flat and is provided, as seen in plan view, with an annularly-shaped rim portion 2 which projects on all sides thereof outwardly beyond the lateral walls of the vehicle top primarily constituted by the window surfaces of the windshield, rear window and side windows. The rim portion generally designated by reference numeral 2 is formed by a hollow body or bearer member, the cross section of which has at least approximately the form of a triangle standing on one of its points as seen in cross section. In FIGURE 2, various cross-sectional lines are indicated which will be referred to hereinafter, and more particularly, line A—B designates a cross section through the roof rim portion 2 within the region of the windshield, line C—D a cross section therethrough within the region of the door, line E—F a cross section therethrough within the region of a stationary side window, and line G—H a cross section therethrough within the region of the rear window.

The hollow body or bearer member 2, which is preferably made of sheet metal, may be constructed in different ways, for instance, as shown in the various embodiments according to FIGURES 3 to 8.

Figure 3:
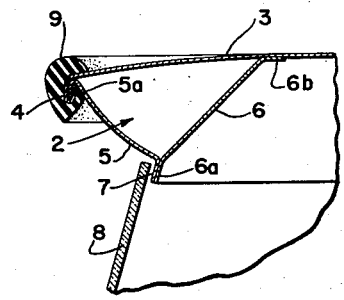

FIGURE 3 shows a cross-sectional view of one embodiment of the roof rim portion in accordance with the present invention which may be taken along any of the cross-sectional lines indicated in FIGURE 2. The upper wall of the hollow body or bearer generally designated by reference numeral 2 is formed by the rim of the slightly arcuate main roof surface 3 itself which is connected at the outer edge thereof by means of the flange portion 4 thereof with the flange portion 5a of a sheet-metal strip 5 which is disposed at an angle to the roof surface 3. The sheet-metal strip 5 forms the outer lower wall of the hollow body or bearer member 2 and extends at an outwardly upwardly direction. A sheet-metal strip 6 is inserted between roof rim portion 3 and outer lower wall 5 to form the third wall of the hollow body 2. The sheet-metal strip 6 is connected in any suitable manner, for example, by welding, at the flange portion 6b thereof with the roof surface 3 and at the flange portion 6a thereof with the flange portion 7 provided at the inner end of the sheet-metal member 5. The flange portion 7 of the sheet-metal member 5 simultaneously forms an abutment surface for the window 8. A guard rail 9 made, for example, of rubber or rubber-like synthetic material is arranged at the flange portion 4 at least within the region of the door. It is thus seen that the roof rim surface 3 and the sheet-metal strips 5 and 6 form essentially a triangle which stands approximately on its point formed by the intersection of members 5 and 6, as seen in cross section.

In the embodiment according to FIGURE 4, which again shows a cross-sectional view taken along any of the section lines of FIGURE 2, the two lower walls of the hollow body or bearer, generally designated by reference numeral 2a, are formed by the rim portion of the main roof surface 10 itself which is shaped appropriately into a channel-like structure of approximately triangular shape in cross section. More particularly, the outer rim portion of the roof surface 10 is provided with a section 10a bent downwardly essentially parallelly to the window 8 which is followed by a section 10e extending outwardly at right angle to the section 10a and by a downwardly and outwardly inclined section 10f which together with the section 10e forms a channel portion for accommodating therein the window 8. The upwardly and outwardly inclined section 10b adjoins the section 10f and in turn is followed by an essentially horizontal section 10c provided with a downwardly extending flange portion 10d. It is thus seen that the rim of the roof surface 10 is shaped into the form of a triangle whose two sides are formed by sections 10a and 10b and of which the angle normally formed by the intersection thereof is replaced by a channel-like portion formed by sections 10e and 10f. The hollow body 2a which is open on top is closed by a sheet-metal strip 11 which is provided with an upwardly projecting flange portion 11a at the outer end thereof extending oppositely with respect to flange portion 10d. The main roof surface 10 is appropriately connected, for example, by welding, with the sheet-metal member 11 at the places 10 and 10c of overlap therewith. A protective strip or guard rail 12 of suitable material is mounted on the oppositely angularly-bent flange portions 10d and 11a. The inner end of the sheet-metal member 11 is formed into a rim portion 13 which projects upwardly beyond the roof surface 10 and which serves as abutment or support, for example, for a suitcase 14.

The channel formed by the roof sections 10e and 10f is completed on the inside thereof by a ledge member 15 welded thereto which is provided in turn with an outwardly projecting flange portion 15a against which the window 8 may abut. The channel formed by ledge member 15 and sections 10e and 10f serves to accommodate therein the upper edge of the window pane 8 when the window is closed.

Thus, walls 10a, 10b and 11 again form a hollow body or bearer member 2a of essentially generally triangular shape standing on the point which has been replaced by a channel.

FIGURE 5 shows still another modification of the roof rim portion in cross section taken along any of the cross-sectional lines of FIGURE 2. In this embodiment, the upper wall of the hollow body or bearer generally designated by reference numeral 2b is again formed by the rim portion 16a of the main roof surface 16 itself whereby the rim portion 16a is appropriately shaped by being offset in a step-like manner with respect to the slightly arcuate inner part 16 constituting the main roof surface as will be described more fully hereinafter. The two lower wall portions of the hollow body 2b are connected integrally with each other and consist of a sheet-metal strip 17 which is essentially angularly bent as seen in cross section.

More particularly, the slightly arcuate main roof surface 16 is provided with an off-set rim portion 16a, which is off-set in the downward direction with respect to the surface 16 thereof by the distance of the off-set portion 16b. The outer end of the section 16a is bent downwardly into a flange portion 16c. The other two sides of the triangle which are formed by the sheet-metal members generally designated by reference numeral 17 are connected with the outer end of the roof section 16a by means of a downwardly bent flange portion 17c, forming the outer end of the outer lower side of the triangle constituted by the sheet-metal section 17a. The flange portions 16c and 17c are thereby connected with each other in any suitable manner, for example, by welding. A guard rail 18, made of any suitable material, such as rubber, is again placed over the welded seam formed by the flange portions 16c and 17c.

The third side of the triangle is formed by the sheet-metal section 17b which is connected, for example, by means of welded joints at the off-set portion 16b of the roof surface. The two sides formed by the sheet-metal sections 17a and 17b are connected with each other by a loop portion 19 of substantially U-shape which at the same time forms an abutment surface for the window pane 8. Several tubular members 20 are inserted into the room section 16a outwardly of the loop portion 19 and are rigidly connected with the walls of the hollow body 2b. For example, pressed-in or punched-in sections 17d or possibly separate brackets or angle irons which are suitably secured or welded to the sheet-metal section 17a, support and are welded to respective tubular members 20. Moreover, the apertures provided in the roof section 16a which accommodate the tubular members 20 may be punched out in such a manner that small flange portions are provided along which the tubular members 20 can be connected, for instance, by welding. The tubular members 20 are evenly distributed over the entire circumference of the roof and serve as support means for objects emplaced thereon or as securing means for the luggage pieces disposed on the roof, and for the latter purpose may be internally threaded for connection with suitably threaded bolt members having eye-portions or the like.

Again, it is to be noted that the hollow body or bearer member 2b is of essentially triangular shape with sections 16a, 17a and 17b constituting the sides thereof, and with the triangle standing on its point formed by the loop portion 19 which replaces the point otherwise formed by the intersection of sections 17a and 17b.

FIGURE 6 shows a cross-sectional view through a still further modified embodiment which cross section again may be taken along any of the sectional lines of FIGURE 2. In this embodiment, the hollow body or bearer member constituting the roof rim portion which is generally designated by reference numeral 2c, forms a structural unit completely independent from the main roof 21 which may be inserted in any suitable manner into the ring-shaped aperture enclosed by the rim roof portion 2c. The roof 21 may thereby be made of a material different from that of the roof rim 2c, for example, of a transparent synthetic or plastic material.

The roof rim portion 2c in this embodiment is formed by a sheet-metal strip or member generally designated by reference numeral 22 which is angularly bent as seen in cross section and which is completed into a triangle by a second flat sheet-metal strip or member 23 to form a triangularly-shaped hollow body 2c as seen in cross section. The two sides of the triangle formed by the angularly-bent-sheet-metal strip 22 are designated by reference numeral 22a and 22b which are disposed at an approximately right angle to each other and of which the inner section 22b extends outwardly downwardly and the section 22a outwardly upwardly. The outer end of the sheet-metal section 22a is bent into the shape of an inverted U-shaped channel open at the bottom and provided with a flat base portion and two leg portions extending perpendicular thereto of which the outer leg portion 22g again forms a flange portion. The outer end of the sheet-metal strip 23 is shaped into a similar U-shaped channel section 25 which is open on top and which again is provided with an essentially flat base portion and two leg portions extending perpendicularly thereto of which the outer leg portion 25a forms a flange portion. The sheet-metal section 22a and sheet-metal strip 23 are connected with each other, for example, by welding the flat base portions of the U-shaped channel sections 22f and 25 with each other. A guard rail 26 of any suitable material, for example, rubber, is again placed over the outer ends 22g and 25a of the channel sections 22f and 25. The guard rail may thereby be inserted into the channels 22f and 25 and is securely held in place by the flange portions 22g and 25a.

The connection between the sheet-metal section 22b and 23, i.e., the inner connection of the triangle of the hollow body 2c is appropriately so constructed that at the same time it also serves as possible connection for the roof. For that purpose, the sheet-metal section 22b is bent into a vertical straight section 22c which in turn is bent back upon itself by the circular section 22d into a vertical straight section 22e spaced from and parallel to the vertical section 22c. The upper sheet-metal strip 23 is provided with an upwardly extending flange portion 23a which extends between the vertical sections 22c and 22e for connection therewith, for example, by welding. It should be noted that the section 22d forms an essentially tubular sheet-metal member which has an opening to enable the flange portion 23a to extend therethrough. The outer rim portion 24 of the roof may then be so constructed as to be of part cylindrical shape complementary to the shape of the section 22d along which it may be suitably connected with the hollow body or bearer 2c in any suitable manner, for example, by bonding if a plastic roof is used. It is thus seen that the roof 21 may be suitably emplaced onto the hollow body or bearer member 2c which constitutes a supporting frame therefor and which extends around the entire roof.

A ledge member 15, which is suitably secured to the sheet-metal section 22b, is provided with an outwardly extending flange portion 15a to form an abutment surface for the window pane 8.

Again it should be noted that the hollow body or bearer member 2c is of essentially triangular shape having three sides 22a, 22b and 23 and stands on its point formed by the intersection between sections 22a and 22b.

FIGURE 7 represents still another embodiment in accordance with the present invention which again may be taken along any of the section lines of FIGURE 2 and which resembles the embodiments according to FIGURES 3 and 5 by the use of the rim portion of the main roof surface 27 itself to form the upper wall of the hollow body or bearer member 2d. However, in this embodiment, the main roof surface 27 is so constructed that in the center part thereof it is arched, whereas the rim portion or section 27b which is connected with the main roof surface 27 by an essentially flat horizontal section 27a extends upwardly outwardly. As a result of such a construction, a channel-shaped recess generally designated by reference numeral 30 is provided between the arched main center part 27 of the roof and the rim portion 27b thereof. The two other sides of the triangularly-shaped hollow body or bearer member 2d are constructed in a manner similar to that of FIGURE 6 by an angularly-bent sheet-metal strip generally designated by reference numeral 28 of which the inner upwardly inclined section 28a is connected with the horizontal section 27a by means of a flange portion 28b extending essentially parallel to the section 27a. The connection may be again in any suitable manner, for example, by welding. The outwardly and upwardly inclined section 28c is provided at the outer end thereof with an essentially U-shaped portion 29 which accommodates between the two leg portions thereof the flange portion 27c of the roof rim. The flange portion 27c is thereby connected in any suitable manner, for example, by welding, with the legs of the U-shaped portion 29. A protecting ledge or guard rail 31, for example, of rubber, is placed over the U-shaped portion 29. An abutment ledge 15 is welded to the section 28a and is provided with an outwardly projecting flange portion 15a to form an abutment surface for the window pane 8.

Thus, the hollow body or bearer member 2d is again essentially triangularly-shaped and stands on the point thereof formed by the two sides 28a and 28c, as seen in cross section.

FIGURE 8 illustrates a cross-sectional view of an embodiment in accordance with the present invention for a motor vehicle having a slidable door. The cross-section of FIGURE 8 is thereby taken along line E—F of FIGURE 2 through a top of a vehicle provided with a slidable door.

In this embodiment, the rim portion of the main roof surface 32 itself again forms the upper wall of the hollow body, generally designated by reference numeral 2e. The rim portion of the roof 32 is thereby shaped to provide an essentially flat outwardly and upwardly projecting section 32b which is connected with the roof surface 32 through an outwardly downwardly inclined section 32a. The outer end of the section 32b is bent down at a right angle thereto into a section 32c which is followed by an essentially horizontal section 32d bent at the outer end thereof into an upwardly extending flange portion 32e. The inner wall of the construction according to FIGURE 8 is formed by a sheet-metal strip generally designated by reference numeral 33, which includes a downwardly outwardly inclined main section 33a connected with the roof surface 32 by means of the horizontal inwardly extending upper flange portion 33b which is connected with the roof 32 in any suitable manner. The section 33a is adjoined by a downwardly extending section 33c which extends, for instance, essentially parallel to the window pane 8 and which is provided at the outer end thereof with an outwardly extending flange portion 33d forming an abutment surface for the window pane 8. The embodiment according to FIGURE 8 also provides within the hollow body 2e guide means for the slidable door of the vehicle. For that purpose, the sheet-metal strip 34 which forms the third side of the triangle is provided with a longitudinal slot. The sheet-metal strip or member 34 is provided at the outer end thereof with an outwardly upwardly extending flange portion 34a for connection with the flange portion 32e and at the inner end with a downwardly extending flange portion 34b for connection with the section 33c, for example, by welding. A guide rail generally designated by reference numeral 35 is arranged behind the longitudinal slot provided in the sheet-metal member 34. The guide rail 35 is provided with a flat base section 35a by means of which it is suitably secured, for example, by welding or bolting, with the section 32b of the roof. The box-shaped guide rail is completed by the side portions 35b and 35d which in turn are provided with oppositely bent flange portions 35c and 35e, respectively, by means of which they are suitably secured, for example, by welding or bolting, with the sheet-metal member 34. A protecting strip or guard rail 36 of suitable material, such as, for example, rubber, is again mounted over the outer edge of the hollow body 2e and more particularly is emplaced over the flanged portions 32e and 34a.

The hollow body 2e is also essentially triangularly-shaped by reason of the fact that the triangle is formed by the three sides 34, 33a and the rim portion of the flat roof 32 which extends in one single plane up to the flange portion 32e and of which the section designated in FIGURE 8 by numeral 32d is merely a continuation within the regions of the hollow frame or body 2e which are not provided with the guide rail 35 for the slidable doors, for example, along the rear window and the front window. The side formed by the ordinarily flat rim portion of the roof surface 32 is only slightly changed within the regions where the guide rail 35 is used by the configuration of the sections 32a, 32b and 32c which replace a part of the otherwise flat rim portion.

The hollow bodies or bearers 2 through 2e and the roof surfaces surrounded thereby may be made of any suitable material, such as metal or plastic material. Furthermore, it is not necessary that all of the wall parts of the hollow bodies 2 through 2e be made of the same material. For example, it is possible that the upper wall portion of the hollow body or bearers 2 through 2e are made of a different material as the two lower sides of the triangle forming the hollow bodies. Moreover, the connections between the individual wall parts or sections of the hollow bodies or bearer members 2 through 2e with each other are not limited to the shown and described embodiments. The wall portions of the hollow bodies or bearers 2 through 2e may be connected in any other suitable manner, for example, by bonding, cementing or the like, depending also on the type of material used.

Since the remainder of the vehicle does not form any part of the present invention, the same has only been shown schematically. The roof may thereby be supported in any suitable manner on the chassis or main frame of the vehicle, for example, by upright frame or bearer members, girders or the like, as shown more particularly in my copending applications, Serial No. 687,519, filed October 1, 1957, entitled "Motor Vehicle Frame Construction," and Serial No. 687,475, filed October 1, 1957, entitled "Sedan Type Motor Vehicle."

While I have shown and described several embodiments in accordance with the present invention, it is understood that the same is not limited thereto but is susceptible of many changes and modifications within the spirit of the present invention and I intend to cover all such changes and modifications as encompassed by the appended claims.

I claim:
1. A motor vehicle comprising a closed body having lateral walls, essentially flat upwardly facing roof surface means, hollow bearer means forming a rim portion reinforcing said roof surface means along at least the lateral sides and front edge thereof and projecting beyond the lateral walls of said body, said hollow bearer means including a first element attached to the underside of said roof surface means inwardly from the margin thereof and extending outwardly and downwardly, said first element being also essentially inwardly of said lateral walls, and a second element secured to said roof surface means contiguous to its margin and extending downwardly and inwardly, said first and second elements being joined to thereby effectively form one corner of a triangle pointing downwardly adjacent to the plane of said lateral walls whereby said two elements in conjunction with said lateral walls form a substantially Y-shaped configuration in a transverse vertical cross-section.

2. A motor vehicle according to claim 1, wherein said hollow bearer means include downwardly projecting edge means constituting an abutment surface for a window of said top.

3. A motor vehicle according to claim 1, wherein at least one wall section of said hollow bearer means is formed integrally with said roof surface means.

4. A motor vehicle according to claim 1, wherein said hollow bearer means is made of two parts, one of said parts forming two integrally connected wall sections of said hollow bearer means constituting two sides of said triangle.

5. A motor vehicle according to claim 4, wherein said one wall part is formed integrally with said main roof surface and wherein the other part constituting the third side of said triangle is inserted therein.

6. A motor vehicle according to claim 1, wherein said hollow bearer means includes support means extending above said main roof surface and located at the inner upper point of the triangle.

7. A motor vehicle according to claim 1, wherein said hollow bearer means is provided with upwardly extending flange means extending upwardly beyond the upper wall of said hollow bearer means.

8. A motor vehicle according to claim 7, further comprising guard rail means secured to said upwardly extending flange means at least within the region of the door of the vehicle.

9. A passenger motor vehicle according to claim 1, wherein said bearer means is formed by three sheet-metal strips welded together and each forming a respective side of the triangle.

References Cited in the file of this patent

UNITED STATES PATENTS

| | | |
|---|---|---|
| 1,656,721 | Breneman | Jan. 17, 1928 |
| 1,808,561 | Ledwinka | June 2, 1931 |
| 2,226,615 | Killen | Dec. 31, 1940 |
| 2,369,579 | Kobligk | Feb. 13, 1945 |
| 2,576,354 | Oswald | Nov. 27, 1951 |
| 2,643,913 | Lyon | June 30, 1953 |

FOREIGN PATENTS

| | | |
|---|---|---|
| 765,401 | Great Britain | Jan. 9, 1957 |
| 223,455 | Switzerland | Mar. 6, 1941 |

OTHER REFERENCES

Ser. No. 377,449, Tandelzke (A.P.C.), published May 25, 1943.